US011356290B2

(12) United States Patent
Engelhardt et al.

(10) Patent No.: US 11,356,290 B2
(45) Date of Patent: Jun. 7, 2022

(54) METHOD AND DEVICE FOR COMMISSIONING A SMART HOME APPLIANCE

(71) Applicant: Robert Bosch GmbH, Stuttgart (DE)

(72) Inventors: Markus Engelhardt, Moessingen (DE); Desmond Low, Stuttgart (DE); Alexander Grosch, Winnenden (DE)

(73) Assignee: Robert Bosch GmbH, Stuttgart (DE)

( * ) Notice: Subject to any disclaimer, the term of this patent is extended or adjusted under 35 U.S.C. 154(b) by 1076 days.

(21) Appl. No.: 14/870,086

(22) Filed: Sep. 30, 2015

(65) Prior Publication Data
US 2016/0094360 A1  Mar. 31, 2016

(30) Foreign Application Priority Data
Sep. 30, 2014  (DE) ............... 10 2014 219 763.5

(51) Int. Cl.
*H04L 12/28* (2006.01)
*G10L 15/22* (2006.01)

(52) U.S. Cl.
CPC ......... *H04L 12/2807* (2013.01); *G10L 15/22* (2013.01)

(58) Field of Classification Search
CPC ................................................ H04L 41/0803
See application file for complete search history.

(56) References Cited

U.S. PATENT DOCUMENTS

| 9,922,646 B1 * | 3/2018 | Blanksteen | H04S 7/302 |
| 2010/0138007 A1 * | 6/2010 | Clark | H04L 12/2809 |
| | | | 700/90 |
| 2013/0272223 A1 * | 10/2013 | Mathews | H04W 84/18 |
| | | | 370/329 |
| 2014/0021026 A1 * | 1/2014 | Sleator | G06F 13/409 |
| | | | 200/52 R |
| 2014/0173059 A1 * | 6/2014 | Koningstein | H04L 41/0806 |
| | | | 709/220 |
| 2014/0316777 A1 * | 10/2014 | Cha | G06F 3/167 |
| | | | 704/231 |
| 2014/0357248 A1 * | 12/2014 | Tonshal | H04M 1/72577 |
| | | | 455/418 |
| 2015/0066516 A1 * | 3/2015 | Nishikawa | F24C 7/08 |
| | | | 704/275 |
| 2015/0097689 A1 * | 4/2015 | Logue | H04W 4/38 |
| | | | 340/632 |
| 2016/0140173 A1 * | 5/2016 | Kumar | G06F 16/24534 |
| | | | 707/706 |

FOREIGN PATENT DOCUMENTS

| DE | 697 12 485 T2 | 12/2002 |
| DE | 10 2011 121 555 A1 | 6/2013 |
| KR | 10-2013-0068303 A | 6/2013 |
| WO | 2013/071999 A1 | 5/2013 |

* cited by examiner

*Primary Examiner* — Nicholas R Taylor
*Assistant Examiner* — Sm Z Islam
(74) *Attorney, Agent, or Firm* — Maginot, Moore & Beck LLP

(57) ABSTRACT

The disclosure provides a method for commissioning a smart home appliance, having the following features: detecting that the smart home appliance is due to be commissioned; configuring the smart home appliance in an interactive voice operation with a user of the smart home system; and adding the smart home appliance to the smart home system. The disclosure also provides a corresponding device, a corresponding computer program and a corresponding storage medium.

7 Claims, 3 Drawing Sheets

METHOD AND DEVICE FOR COMMISSIONING A SMART HOME APPLIANCE

This application claims priority under 35 U.S.C. § 119 to application no. DE 10 2014 219 763.5, filed on Sep. 30, 2014 in Germany, the disclosure of which is incorporated herein by reference in its entirety.

BACKGROUND

The present disclosure relates to a method for commissioning a smart home appliance. The present disclosure also relates to a corresponding device, a corresponding computer program and a corresponding storage medium.

The generic term "smart home" is being used increasingly in building automation to cover technical processes and systems in homes and residential buildings that are designed to facilitate an increase in the quality of life and home-living, security or energy efficiency by means of networked and remotely controllable appliances and installations and automatable procedures. This term therefore also includes both the networking together of building services and domestic appliances such as lamps, blinds, heating system, cooker, refrigerator and washing machine and the networking together of home entertainment equipment for instance by central storage and home-wide use of video and audio content. Thus in this sense of the term, a home is a smart home in particular when numerous luminaires, control switches and appliances used in the home are networked together.

The challenge here is the networking together of the smart home appliances, in the respect that it presents the problem of adding additional communications partners to the smart home infrastructure. Commissioning or adding new components is conventionally done using additional devices having a display and keypad, such as a PC, notebook or smartphone. For instance WO 2013071999 A1 proposes a method that comprises the steps of providing a data storage medium which is associated with the smart home appliance and which stores setup data for incorporating the smart home appliance into the smart home system, of the central control unit of the smart home system reading the setup data stored on the data storage medium, and of forming a communication channel between the smart home appliance and the central control unit on the basis of the setup data.

SUMMARY

The disclosure provides a method for commissioning a smart home appliance, a corresponding device, a corresponding computer program and a corresponding storage medium.

One advantage of this solution is its low cost. For instance, additional components do not need to be registered in the system or configured in order to commission the smart home appliance, which dispenses with the need for an additional device having a display and keypad and for special software. Instead, configuration steps such as the assignment to a specific room in which the component is installed or specifying the required behavior and other specific parameters of the component, can take place in a simple interactive voice operation. This form of commissioning means that there is no need either to own or to be versed in how to use a PC, notebook, smartphone or the like, and the user is spared from using complicated software.

The disclosure defines further advantageous embodiments. For instance, the smart home appliance can itself detect that it is due to be commissioned. In this case, the subsequent interactive voice operation takes place directly between the smart home appliance and the user, which equates to an intuitive approach to configuring new hardware components.

In another variant, the smart home system detects that the smart home appliance is due to be commissioned, and therefore the interactive voice operation can take place between the user and a component of the smart home system, which component is networked to the smart home appliance. Even smart home appliances that do not have a facility for voice control can thereby be commissioned.

It can still be time-consuming to use interactive voice operation to configure a plurality of components. Therefore the smart home system preferably automatically makes predetermined settings at the smart home appliance before it enters into interactive voice operation with the user. In this scenario, the interactive voice operation can occur simply in the form of querying the settings that need clarifying.

According to one embodiment of the disclosure, the interactive voice operation comprises for this purpose both voice recognition and voice output, and is conducted by a suitable interactive voice system. Users who have visual impairments, for instance a cataract or age-related macular degeneration, and even blind users thereby have access to commissioning the smart home appliance.

A keypad or the touch sensor in a display may provide further assistance in configuring the smart home appliance. The advantages of voice-controlled commissioning can hence be combined advantageously with the haptic feedback of traditional input devices.

Finally, one possibility to consider is that of configuring the smart home system for the first time before commissioning the smart home appliance. If it proves necessary to integrate additional appliances, for instance to configure a network forming the basis of the smart home system, then a commercial PC can be used, for instance, to perform an initial configuration before additional smart home appliances are added to the smart home system without using such tools.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
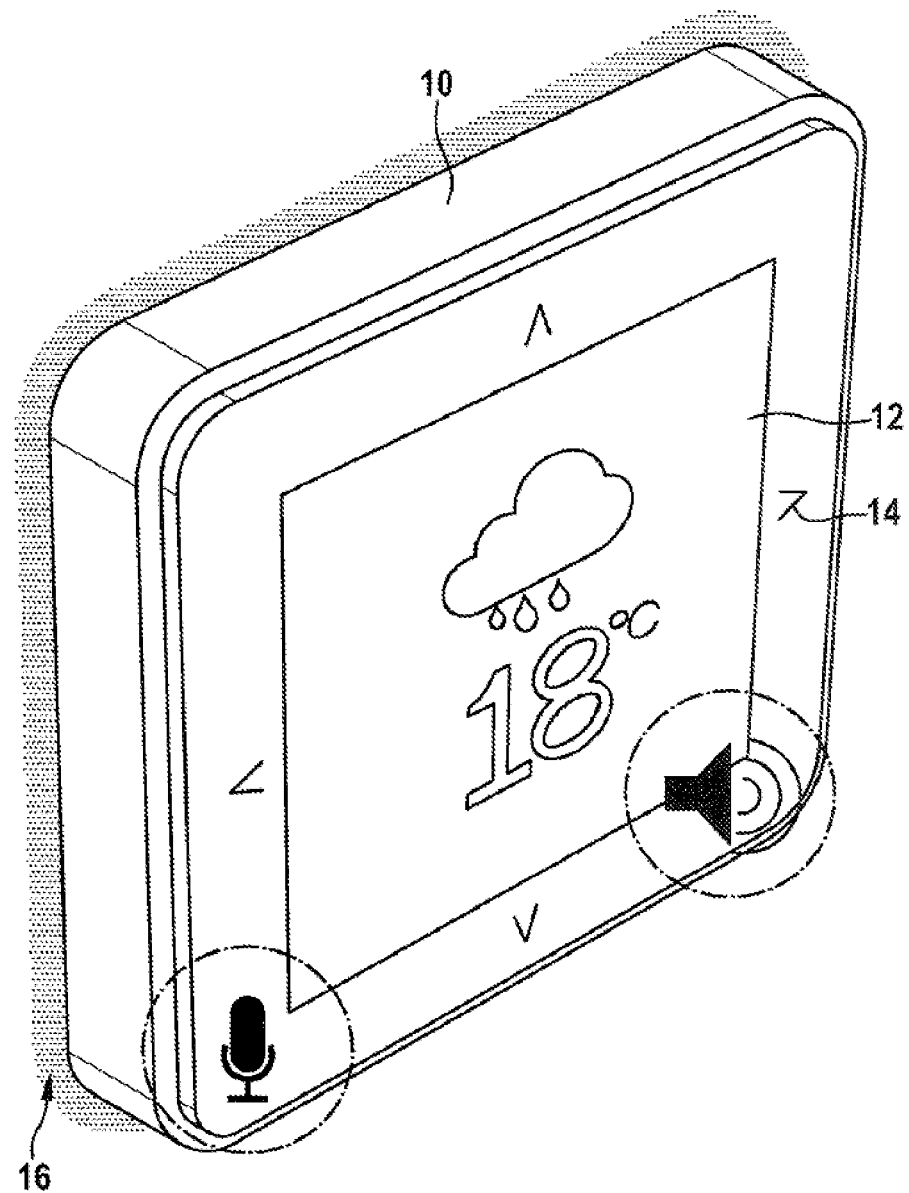
FIG. 1 shows the perspective view of a smart home appliance to be commissioned according to the disclosure.

The fundamental procedure of a method according to an embodiment of the disclosure shall now be explained with reference to FIG. 1. The subject of the proposed method is here the smart home appliance 10 shown in the illustration, which is meant to be commissioned in a smart home system, which is not shown in full in the drawing. For this purpose, the smart home system has already been configured for the first time using a PC (also not shown) prior to the planned commissioning of the smart home appliance 10.

Figure 2:
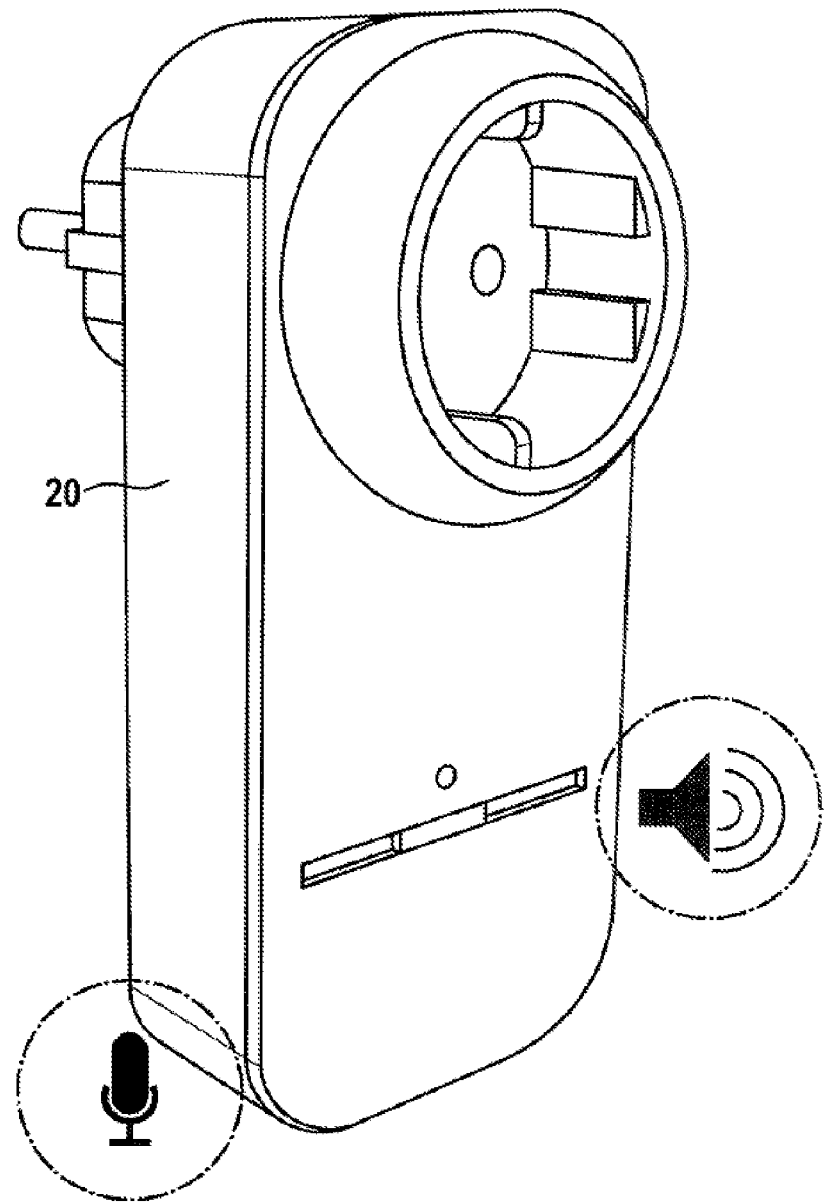
FIG. 2 shows the perspective view of a further smart home appliance to be commissioned according to the disclosure.

The smart home appliance 10 comprises for this purpose a display 12 arranged opposite the rear mounting surface, which display comprises four capacitive touch sensors 14, which can be used to assist in the configuration procedure as required. Obviously, an alternative embodiment may use instead an optional keypad or another input device without departing from the scope of the disclosure. In addition, a simpler smart home appliance without display and controls, such as the radio-controlled socket 20 shown in FIG. 2, is possible. A computer program stored on a machine-readable storage medium of the smart home appliance 10, 20 is configured to execute the steps of the method described below.

The smart home system initially detects that the smart home appliance 10, 20 is due to be commissioned and automatically makes predetermined settings at the smart home appliance 10, 20 by, for example, copying to the smart home appliance 10, 20 the basic configuration of a similar component already incorporated in the smart home system. Then the smart home system enters into an interactive voice operation with the user via a component of the smart home system, which component is networked to the smart home appliance 10, 20. As part of this interactive voice operation, the smart home system guides the user through the steps required for configuring the smart home appliance 10, 20, which involves in particular querying the settings of the smart home appliance 10, 20 that still need clarifying.

Instead of the smart home system detecting that the smart home appliance 10, 20 is due to be commissioned, this detection can also be performed by the smart home appliance 10, 20 itself, with said interactive voice operation taking place between precisely this smart home appliance 10, 20 and the user. Detecting a renewed commissioning or change to the configuration alternatively can also be initiated by a voice command or a control button.

Figure 3:
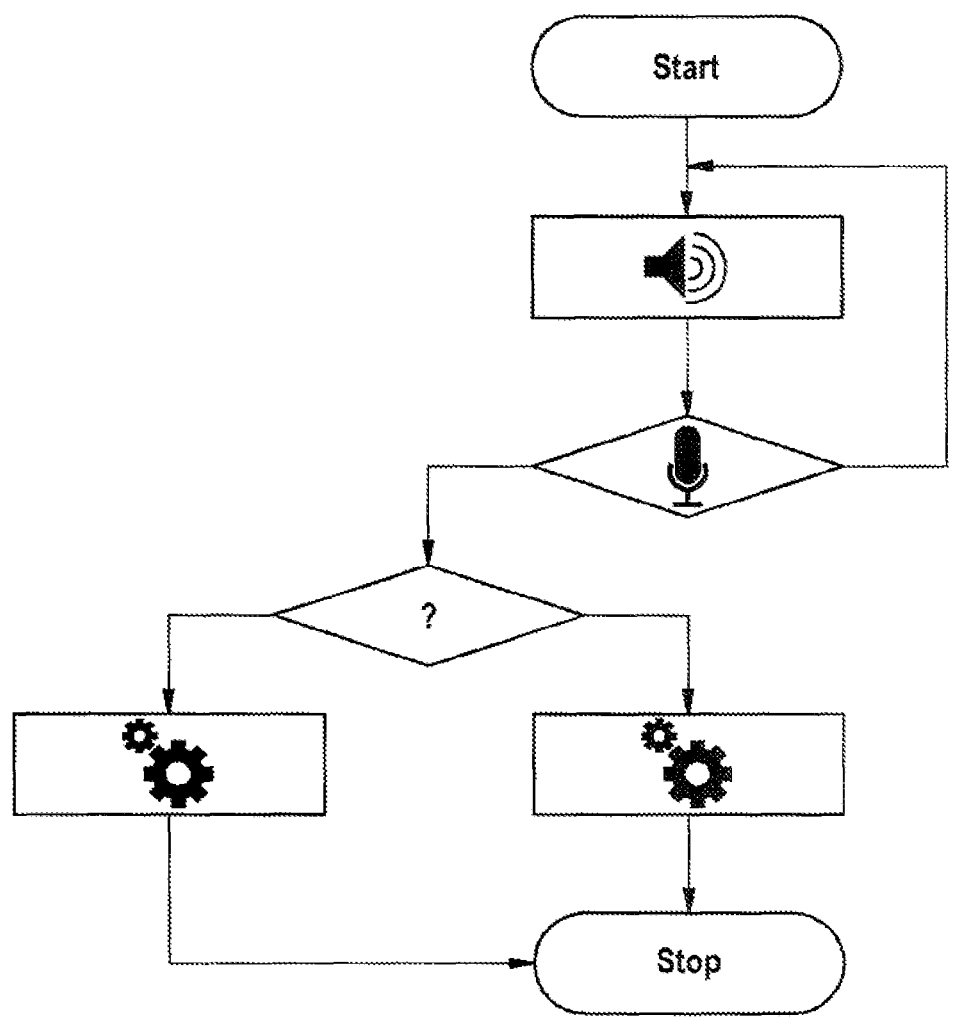
FIG. 3 is an abstract flow diagram for explaining the interactive voice operation conducted in a method according to the disclosure.

The interactive voice operation is here conducted primarily by an interactive voice system of the smart home system and comprises both voice recognition and voice output. The abstract flow diagram shown in FIG. 3 explains this procedure using the example of configuring a parameter. Finally, after the interactive voice operation has concluded, the smart home appliance 10, 20 is added to the smart home system.

What is claimed is:

1. A method for commissioning a smart home appliance in a smart home system, the method comprising:
   detecting that the smart home appliance is due to be commissioned using the smart home system;
   configuring the smart home appliance via an interactive voice operation with a user of the smart home system; and
   adding the smart home appliance to the smart home system,
   wherein the user interacts directly with the smart home system using the user's voice during the interactive voice operation.

2. The method according to claim 1, wherein:
   the detecting that the smart home appliance is due to be commissioned is performed by the smart home system; and
   the interactive voice operation takes place between the user and a component of the smart home system, the component of the smart home system being networked to the smart home appliance.

3. The method according to claim 2, wherein the configuring of the smart home appliance involves (i) predetermined settings and (ii) settings that need clarifying, the configuring of the smart home appliance further comprising:
   automatically configuring the smart home appliance with the predetermined settings using the smart home system;
   entering into the interactive voice operation with the user after the automatic configuring; and
   querying the settings that need clarifying during the interactive voice operation with the user.

4. The method according to claim 1, wherein:
   the interactive voice operation includes voice recognition and voice output; and
   the interactive voice operation is conducted using an interactive voice system.

5. The method according to claim 1, wherein an input device is used to assist the configuring of the smart home appliance, the input device being at least one of a touch sensor of a display and a keypad.

6. The method according to claim 1, further comprising:
   configuring the smart home system before commissioning the smart home appliance.

7. A non-transitory computer readable medium configured to store program instructions for commissioning a smart home appliance in a smart home system, the program instructions being configured to, when executed on a computer:
   detect that the smart home appliance is due to be commissioned using the smart home system;
   utilize voice recognition and voice output to enable a user to configure the smart home appliance via an interactive voice operation; and
   add the smart home appliance to the smart home system.

* * * * *